(12) United States Patent
Asada et al.

(10) Patent No.: US 6,196,722 B1
(45) Date of Patent: Mar. 6, 2001

(54) HYDRODYNAMIC BEARING

(75) Inventors: Takafumi Asada, Hirakata; Hiroaki Saito, Takatsuki; Takao Yoshitsugu, Yonago; Yasuo Saeki, Tottori-ken; Katsunori Sakuragi, Yonago, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/227,968

(22) Filed: Jan. 11, 1999

(30) Foreign Application Priority Data

Jan. 13, 1998 (JP) .................................................. 10-004536

(51) Int. Cl.$^7$ ................................................... F16C 32/06
(52) U.S. Cl. ........................... 384/107; 384/124; 384/135
(58) Field of Search .................................. 384/119, 124, 384/107, 135, 136, 130

(56) References Cited

U.S. PATENT DOCUMENTS

| | | | |
|---|---|---|---|
| 4,141,603 | * | 2/1979 | Remmers et al. ..................... 384/108 |
| 4,445,793 | * | 5/1984 | Shinohara ............................. 384/130 |
| 4,596,474 | * | 6/1986 | Van Roemburg .................... 384/114 |
| 5,141,338 | | 8/1992 | Asada et al. .......................... 384/114 |
| 5,370,463 | * | 12/1994 | Asada et al. .......................... 384/113 |
| 5,407,281 | * | 4/1995 | Chen .................................... 384/107 |
| 5,423,612 | * | 6/1995 | Zang et al. ............................ 384/119 |
| 5,427,456 | * | 6/1995 | Hensel ............................. 384/130 X |
| 5,504,637 | * | 4/1996 | Asada et al. ..................... 384/107 X |
| 5,516,212 | * | 5/1996 | Titcomb ................................ 384/107 |
| 5,533,813 | * | 7/1996 | Makino et al. ....................... 384/115 |
| 5,536,088 | * | 7/1996 | Cheever et al. ...................... 384/107 |
| 5,558,443 | * | 9/1996 | Zang .................................. 384/107 X |
| 5,558,445 | * | 9/1996 | Chen et al. ....................... 384/107 X |
| 5,658,080 | * | 8/1997 | Ichiyama .......................... 384/119 X |
| 5,722,775 | * | 3/1998 | Thijsse et al. ........................ 384/119 |
| 5,765,952 | * | 6/1998 | Dekker et al. .................... 384/107 X |
| 5,791,784 | * | 8/1998 | Ichiyama .............................. 384/107 |
| 5,791,984 | * | 8/1998 | Ichiyama .............................. 384/107 |
| 5,810,480 | * | 9/1998 | Asada et al. .......................... 384/107 |

* cited by examiner

*Primary Examiner*—Charles A Marmor
*Assistant Examiner*—Ha Ho
(74) *Attorney, Agent, or Firm*—Parkhurst & Wendel, L.L.P.

(57) ABSTRACT

It is an object of the present invention to provide a hydrodynamic bearing which is highly reliable and capable of preventing a lubricant contained therein from flowing out of the bearing. In the hydrodynamic bearing, lower and upper end portions of a stationary shaft are properly spaced from a sleeve and a thrust plate, respectively, and an air channel is provided inside the stationary shaft with one end thereof opening to a space defined between an outer circumferential portion of the stationary shaft and the sleeve and with the other end thereof communicating with the outside. Thus, the hydrodynamic bearing has a highly reliable construction which can assuredly prevent the flow-out of the lubricant.

10 Claims, 6 Drawing Sheets

HYDRODYNAMIC BEARING

FIELD OF THE INVENTION

The present invention relates to a hydrodynamic bearing employing a dynamic-pressure hydraulic bearing for use in a disk recording device which is adapted to record and reproduce signals on a magnetic disk while rotating the magnetic disk, a rotary head for a video tape recorder which is rotated at a high speed, and the like.

BACKGROUND OF THE INVENTION

In recent years, recording apparatuses using disks and the like have increased in memory capacity and data transfer speed. This, in turn, has required a disk rotating device for use in such a recording apparatus to be capable of high-speed and high-precision rotation. To this end, a hydrodynamic bearing having a central shaft supported at its opposite ends as disclosed in U.S. Pat. No. 5,504,637 is used in a rotary main shaft of the recording apparatus.

A conventional hydrodynamic bearing will hereinafter be described with reference to FIGS. 7 and 8.

FIG. 7 illustrates a recording device employing the hydrodynamic bearing.

A sleeve 30 provided in the center of a hub 29 is rotatably fitted around a stationary shaft 22 having one end fixed to a lower casing 21. Disks 35A, 35B, 35C, 35D as recording media are attached to the hub 29 as being spaced from each other by spacers 36A, 36B, 36C.

A flange member 24 is attached to the other end of the stationary shaft 22 by an upper shaft 28 as being fitted in a step portion 30A of the sleeve 30. The upper shaft 28 has a male thread, which is threaded in the other end of the stationary shaft 22 so that the flange member 24 is press-fitted to the other end of the stationary shaft 22.

A thrust plate 27 which is opposed to an upper face of the flange member 24 and an outer circumference of the upper shaft 28 is fixed in a recessed portion 29A of the hub 29.

One set or, typically, two sets of herringbone grooves 23A, 23B are provided in at least one of an outer circumferential portion of the stationary shaft 22 and an inner circumferential portion of the sleeve 30. An inner spiral groove 26 is provided in either one of a surface of the step portion 30A of the sleeve 30 and a face of the flange member 24 which are opposed to each other, and an outer spiral groove 25 is provided in at least one of opposed faces of the flange member 24 and the thrust plate 27. These grooves 23A, 23B, 25, 26 and an oil pit 30B are filled with a lubricant 31.

A motor rotor 33 is fixed to the hub 29, and a motor stator 32 is fixed to the lower casing 21. Further, an upper casing 34 is attached to the upper shaft 28.

In the conventional hydrodynamic bearing, the motor rotor 33 starts co-rotating with the hub 29, the sleeve 30, the thrust plate 27, the disks 35A, 35B, 35C, 35D and the spacers 36A, 36B, 36C, when the motor stator 32 is energized to develop a rotating magnetic field.

At this time, the herringbone grooves 23A, 23B collect the lubricant 31 to generate a pressure by pumping action, and the outer spiral groove 25 and the inner spiral groove 26 also collect the lubricant 31. The pressure thus generated causes the hub 29 to rotate in a completely non-contacting state with respect to the stationary shaft 22.

However, the aforesaid arrangement has the following drawbacks.

Since the inner diameter D2 of the thrust plate 27 is slightly greater than the inner diameter D1 of a bearing portion of the sleeve 30 as shown in FIG. 8, the lubricant 31 filled in the herringbone grooves 23A, 23B flows out through the step portion 30A and scatters over the thrust plate 27 as indicated by 31A due to a centrifugal force exerted thereon during high speed rotation.

Further, when air which is dissolved into the lubricant through air-liquid interfaces 38A, 38B during the rotation is accumulated in the oil pit 30B and the like and grows into bubbles 37A, 37B, 37C, 37D, the air-liquid interfaces 38A, 38B are bulged, so that the lubricant 31 flows out from the upper side as indicated by 31A and 31B, and from the lower side as indicated by 31C in FIG. 8. This results in depletion of the lubricant 31 in the herringbone grooves 23A, 23B, the outer spiral groove 25 and the inner spiral groove 26.

DISCLOSURE OF THE INVENTION

It is an object of the present invention to provide a hydrodynamic bearing which is free from the flow-out of a lubricant from a bearing portion thereof and is highly reliable.

The hydrodynamic bearing according to the present invention is characterized in that lower and upper end portions of a stationary shaft are properly spaced from a sleeve and a thrust plate, respectively, and that an air channel is provided inside the stationary shaft with one end thereof opening to a space defined by an outer circumferential portion of the stationary shaft and the sleeve between radial grooves and thrust grooves and with the other end thereof communicating with the outside.

In accordance with the present invention, the lubricant is prevented from flowing out from two open sides of the stationary shaft around the upper and lower end portions thereof, and air bubbles accumulated in the space between the stationary shaft and the sleeve during rotation are expelled through the air channel to the outside. Therefore, the hydrodynamic bearing has a highly reliable construction which is free from the flow-out of the lubricant from the bearing portion thereof.

In accordance with claim 1 of the present invention, there is provided a hydrodynamic bearing which comprises: a stationary shaft fixed at one end thereof to a lower casing and having a flange member and an upper shaft portion adjacent to the other end thereof; a sleeve having a bearing bore in which the stationary shaft is inserted; and a thrust plate fixed to the sleeve and having a face opposed to a plane face of the flange member and an inner circumferential portion opposed to an outer circumferential portion of the upper shaft portion; wherein radial hydrodynamic grooves are provided in at least one of an outer circumferential portion of the stationary shaft and an inner circumferential portion of the sleeve which are opposed to each other; wherein an outer thrust hydrodynamic groove is provided in at least one of the opposed faces of the flange member and the thrust plate; wherein an outer diameter of the upper shaft portion and a diameter of the inner circumferential portion of the thrust plate are smaller than a diameter of the bearing bore of the sleeve; wherein the stationary shaft has a tapered portion provided on a side thereof opposite across the radial hydrodynamic grooves from the flange member and having a progressively decreasing diameter apart from the flange member; wherein the radial hydrodynamic grooves and the outer thrust hydrodynamic groove are filled with a lubricant; and wherein an air channel is provided inside the stationary shaft with one end thereof opening on an outer circumferential portion of the stationary shaft intermediate the flange member and the radial hydrodynamic grooves and with the other end thereof communicating with the outside.

In accordance with claim 2 of the present invention, there is provided a hydrodynamic bearing which has substantially the same construction as the hydrodynamic bearing according to claim 1, except that the upper shaft portion of the stationary shaft has a tapered portion which is opposed to the inner circumferential portion of the thrust plate and has a progressively decreasing diameter as it extends apart from the flange member, instead of the arrangement that the outer diameter of the upper shaft portion and the diameter of the inner circumferential portion of the thrust plate are smaller than the diameter of the bearing bore of the sleeve.

In accordance with claim 3 of the present invention, the hydrodynamic bearing according to claim 1 or 2 is characterized in that the upper face, outer circumferential surface and lower face of the flange member are closely adjacent to the thrust plate and a step portion of the sleeve, and a gap defined therebetween is filled with the lubricant, and that the flange member has a recess circumferentially provided on the outer circumferential surface thereof.

In accordance with claim 4 of the present invention, the hydrodynamic bearing according to claim 1 or 2 is characterized in that two sets of radial hydrodynamic grooves are provided and a portion between the two sets of radial hydrodynamic grooves is sealed by the stationary shaft and the bearing bore of the sleeve, and that the stationary shaft has a circumferential groove as an air pit.

In accordance with claim 5 of the present invention, the hydrodynamic bearing according to claim 1 or 2 is characterized in that the sleeve has a second larger inner diameter portion and a smaller inner diameter portion adjacent to the end thereof toward the lower casing, the inner diameter portions being connected to the bearing bore.

In accordance with claim 6 of the present invention, the hydrodynamic bearing according to claim 1 or 2 is characterized in that the inner circumferential portion of the thrust plate has a smaller inner diameter portion adjacent to an upper face of the thrust plate.

In accordance with claim 7 of the present invention, the hydrodynamic bearing according to claim 1 or 2 is characterized in that the sleeve has a tapered portion provided on an outer circumferential portion thereof adjacent to the lower casing, said tapered portion having a progressively increasing diameter toward the lower casing.

In accordance with claim 8 of the present invention, the hydrodynamic bearing according to claim 7 is characterized in that the tapered portion provided on the outer circumferential portion of the sleeve is coated with an oil repellent film.

In accordance with claim 9 of the present invention, the hydrodynamic bearing according to claim 1 or 2 is characterized in that a portion adjacent to the upper face of the thrust plate is coated with an oil repellent film.

In accordance with claim 10 of the present invention, the hydrodynamic bearing according to claim 1 or 2 is characterized in that an inner thrust hydrodynamic groove is provided in at least one of a lower face of the flange member and a face of the sleeve which are opposed to each other.

DESCRIPTION OF THE EMBODIMENTS

Embodiments of the present invention will hereinafter be described with reference to FIGS. 1 to 6.

Figure 1:
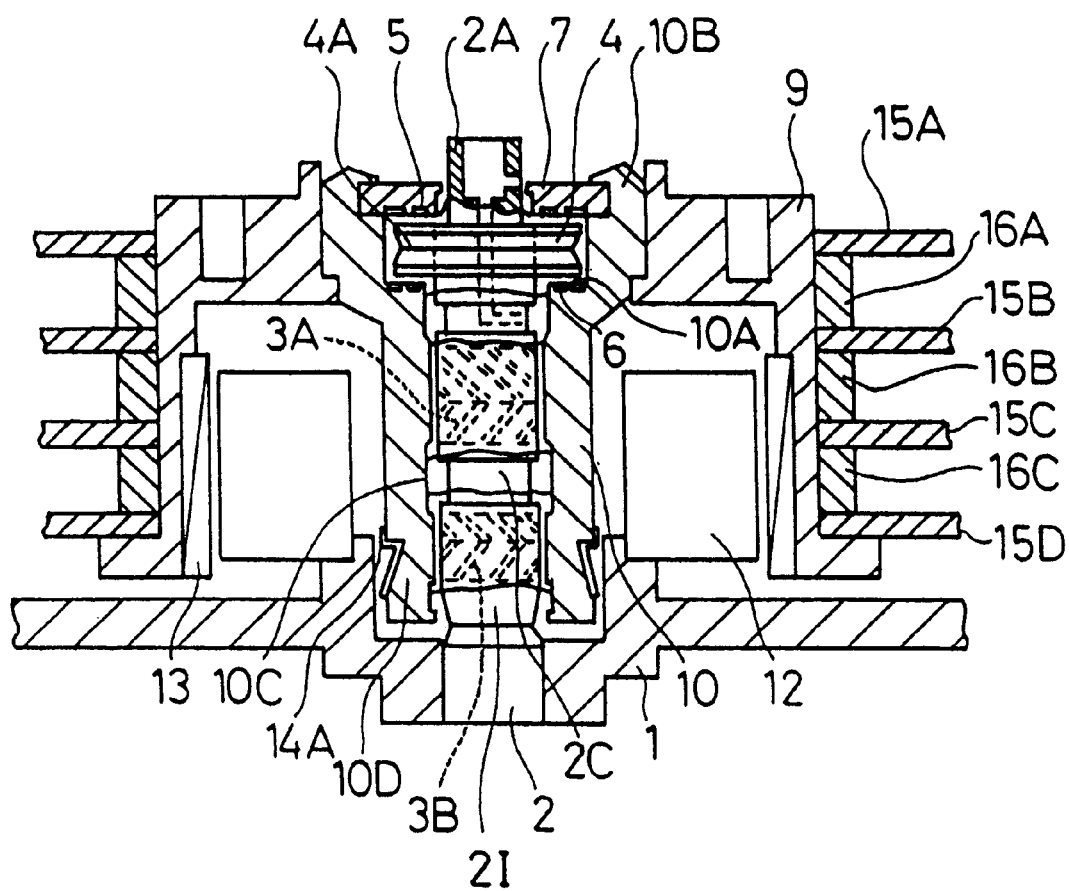
FIG. 1 is a sectional view illustrating a hydrodynamic bearing according to one embodiment of the present invention.
Figure 2:
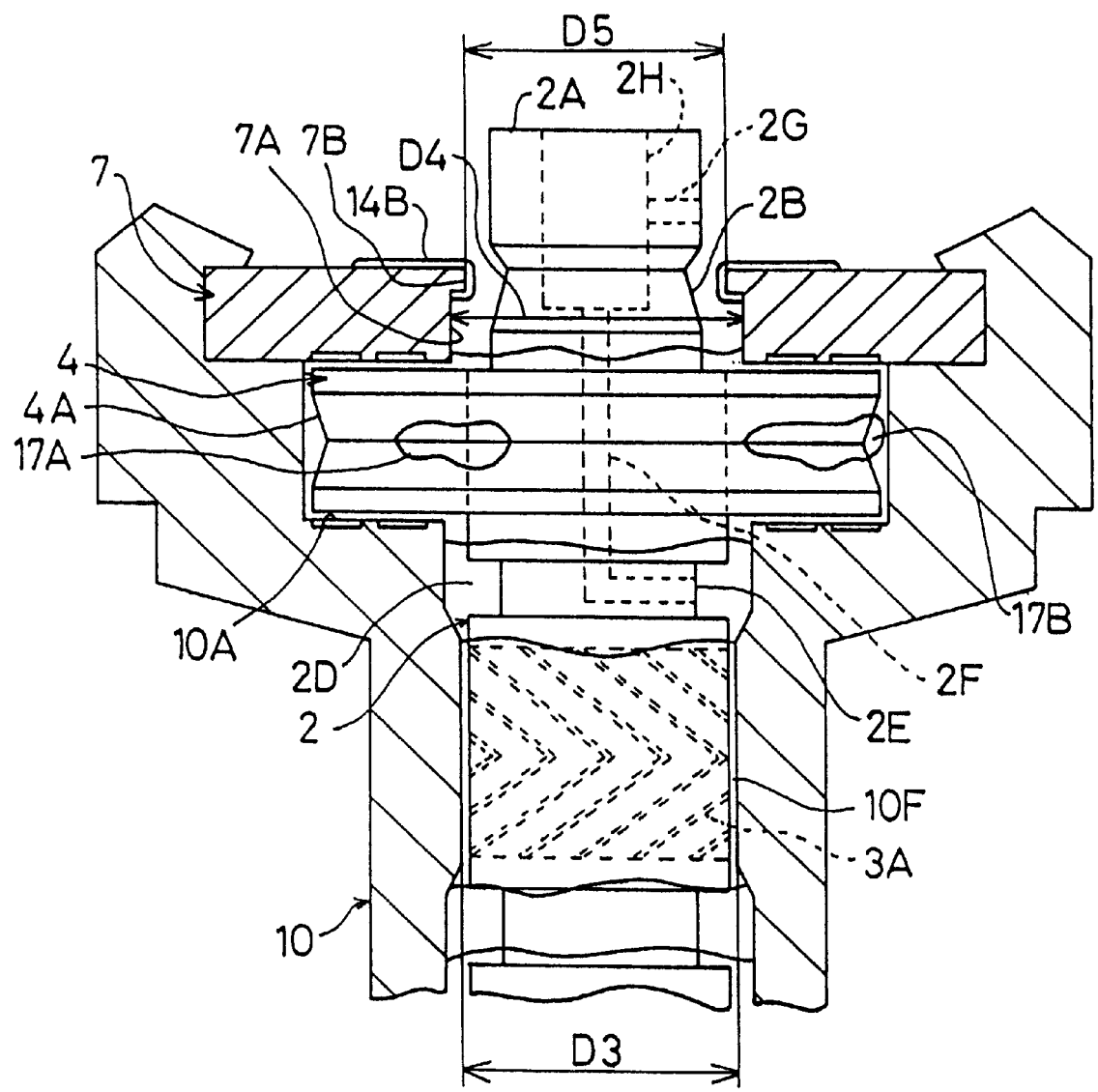
FIG. 2 is a detailed view of a flange member according to the embodiment.

FIGS. 1 and 2 illustrate a hydrodynamic bearing according to one embodiment of the invention.

One end of a stationary shaft 2 is fixed to a lower casing 1. A flange member 4 is provided adjacent to the other end of the stationary shaft 2, and an upper shaft portion 2A extends upwardly from the flange member 4. The flange member 4 and the upper shaft portion 2A may be formed integrally with the stationary shaft. Alternatively, the flange member 4 and the upper shaft portion 2A may be prepared separately from the stationary shaft 2 and then combined with the stationary shaft 2, or the stationary shaft 2 and the upper shaft portion 2A may be formed integrally and then combined with the flange member 4 which is separately prepared.

A sleeve 10 having a bearing bore 10F is rotatably fitted around the stationary shaft 2. The flange member 4 is fitted in a step portion 10A of the sleeve 10.

A generally annular thrust plate 7 is fixed in a recessed portion 10B of the sleeve 10 as being opposed to the flange member 4 and fitted around the upper shaft portion 2A. One set or, typically, two sets of radial hydrodynamic grooves 3A, 3B such as of a herringbone configuration are provided in at least one of an outer circumferential portion of the stationary shaft 2 and an inner circumferential portion of the sleeve 10. In this embodiment, the radial hydrodynamic grooves 3A, 3B are provided only in the inner circumferential portion of the sleeve 10. In the figures, the radial hydrodynamic grooves 3A, 3B, which are hidden by the stationary shaft 2, are indicated by broken lines.

A spiral inner thrust hydrodynamic groove 6 is provided, as required, in at least one of a surface of the step portion 10A of the sleeve 10 and a face of the flange member 4 which are opposed to each other.

An outer thrust hydrodynamic groove 5 is provided in at least one of opposed faces of the flange member 4 and the thrust plate 7. The radial hydrodynamic grooves 3A, 3B, the outer thrust hydrodynamic groove 5 and the inner thrust hydrodynamic groove 6 are filled with a lubricant 11.

A hub 9 is fixed to the sleeve 10, and a motor rotor 13 is fixed to the hub 9. A motor stator 12 is fixed to the lower casing 1.

An air channel 2E, 2F, 2H, 2G communicating with the outside is provided inside the stationary shaft 2 with one end thereof opening on an outer circumferential portion of the stationary shaft 2 between the flange member 4 and the radial hydrodynamic grooves 3A, 3B. If the air channel is positioned inside a casing formed by sealing the ends of the stationary shaft 2, the outside in this case means the inside of the casing.

The diameter D4 of an inner circumferential portion 7A of the thrust plate 7 is smaller than the inner diameter D3 of the sleeve 10. The stationary shaft 2 has a tapered portion 2I provided on an outer side of the radial hydrodynamic grooves 3A, 3B, the tapered portion having a progressively decreasing diameter as it extends apart from the flange member 4.

The sleeve 10 has a tapered portion 10D provided on an outer circumferential portion thereof adjacent to the lower casing 1 and coated with an oil repellent film 14A.

Disks 15A, 15B, 15C, 15D as recording media are attached to the hub 9 as being properly spaced by spacers 16A, 16B, 16C.

A reference numeral 2D denotes a recessed portion which is provided, as required, around the open end 2E of the air channel.

The upper shaft portion 2A has a tapered portion 2B and a thread portion 2H, as required. The stationary shaft 2 is formed with a recess 2C, as required, and the sleeve 10 has a first larger inner diameter portion 10C. A space defined by the recess 2C and the first larger inner diameter portion 10C serves as a pit for the lubricant 11 and air. As required, the flange member 4 is formed with a recess 4A which serves as an air pit.

With the aforesaid arrangement shown in FIG. 1, the motor rotor 13 starts co-rotating with the hub 9, the sleeve 10, the thrust plate 7, the disks 15A, 15B, 15C, 15D and the spacers 16A, 16B, 16C, when the motor stator 12 is energized to develop a rotating magnetic field.

At this time, the radial hydrodynamic grooves 3A, 3B collect and pump the lubricant 11 to generate a pressure, and the outer thrust hydrodynamic groove 5 and the inner thrust hydrodynamic groove 6 also collect the lubricant 11. The pressure thus generated brings the rotary assembly into a completely non-contacting state.

The operation of the hydrodynamic bearing will hereinafter be described in greater detail with reference to FIGS. 2 to 6.

Referring to FIG. 2, the diameter D4 of the inner circumferential portion 7A of the thrust plate 7 is slightly smaller (e.g., by about 0.1 mm to about 1.0 mm) than the inner diameter D3 of the sleeve. Therefore, the lubricant 11 is prevented from flowing out or scattering over the thrust plate 7 even during high speed rotation.

Since the upper, lower and side faces of the flange member 4 are surrounded by the thrust plate 7 and the step portion 10A of the sleeve, even if a centrifugal force is exerted on the outer circumference of the flange member 4 during rotation of the sleeve 10, the lubricant 11 is collected in a recess 4A formed along the outer circumference of the flange member 4 and will not scatter.

The stationary shaft 2 is formed with a recess 2D, as required. If air trapped between the flange member 4 and the radial hydrodynamic grooves 3A and 3B expands, the air is expelled through the air channel 2E, 2F, 2H, 2G to the outside. Therefore, the lubricant 11 will never be forced out.

Figure 3:
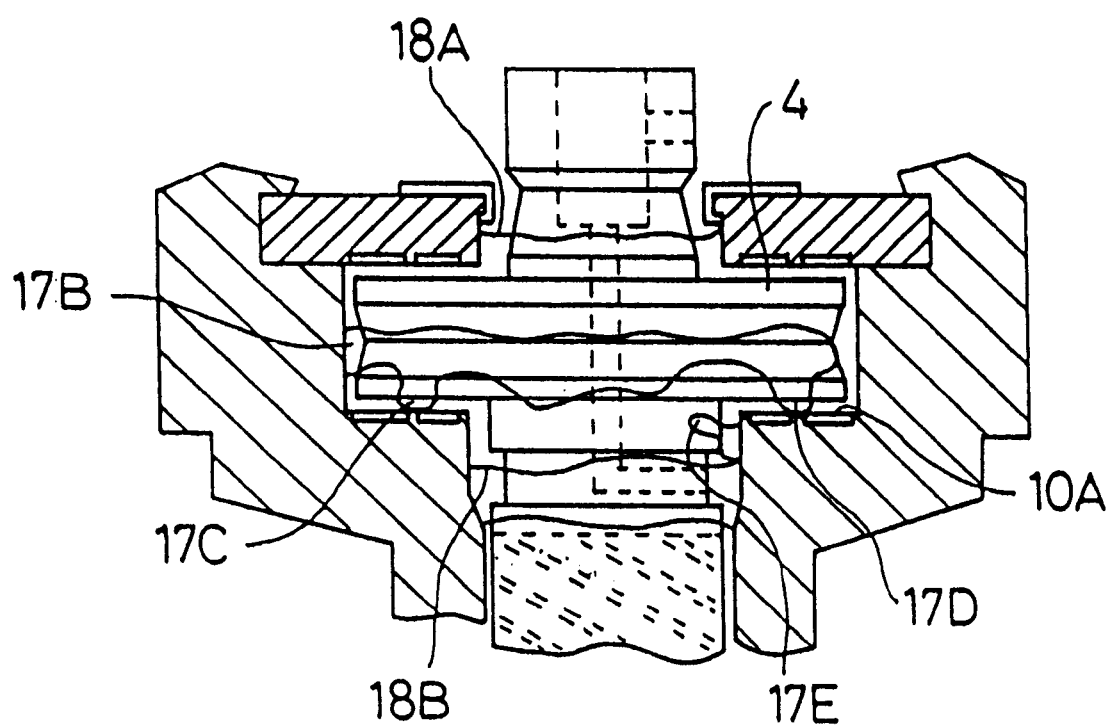
FIG. 3 is a detailed view of the flange member according to the embodiment.

If air bubbles are accumulated as indicated by 17B, 17C, 17D, 17E in FIG. 3 and expand due to a temperature rise by the rotation of the motor, air-liquid interfaces 18A, 18B slightly fluctuate. After a while, the air bubbles pass through a space between the step portion 10A and the lower face of the flange 4 and are expelled through the air channel 2E, 2F, 2G to the outside. The air-liquid interfaces 18A, 18B are finally stabilized as shown in FIG. 3.

Figure 4:
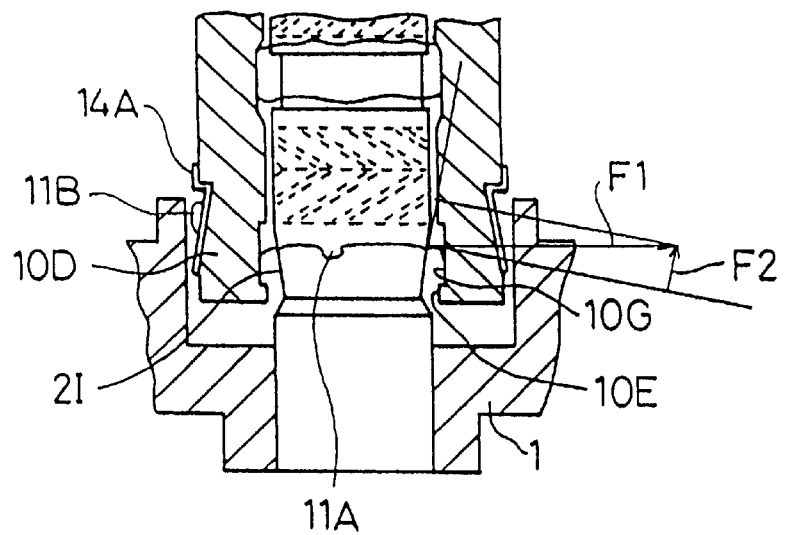
FIG. 4 is a detailed view of a tapered portion of a stationary shaft according to the embodiment.

Referring to FIG. 4, when the lubricant 11A which almost flows out from the lower side of the sleeve 10 is rotated around the tapered portion 2I of the stationary shaft 2, a tangent component F2 of a centrifugal force F1 is exerted on the lubricant and, therefore, the lubricant is prevented from flowing out from the lower side.

A further detailed explanation will be given to the operation with reference to FIGS. 5 and 6.

Figure 5:
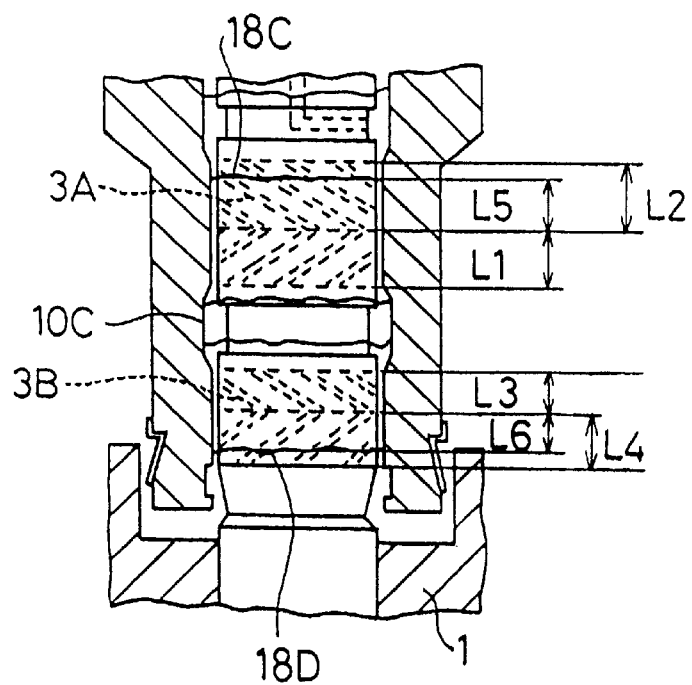
FIG. 5 is a detailed view of radial hydrodynamic grooves according to the embodiment.
Figure 6:
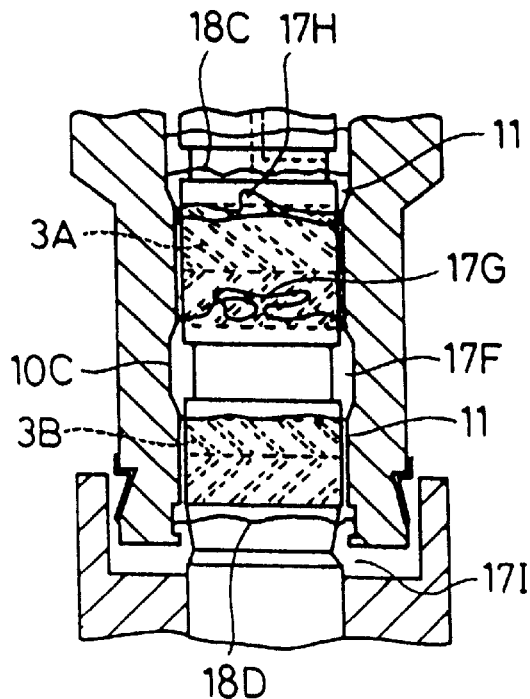
FIG. 6 is a detailed view of the radial hydrodynamic grooves according to the embodiment.
Figure 7:
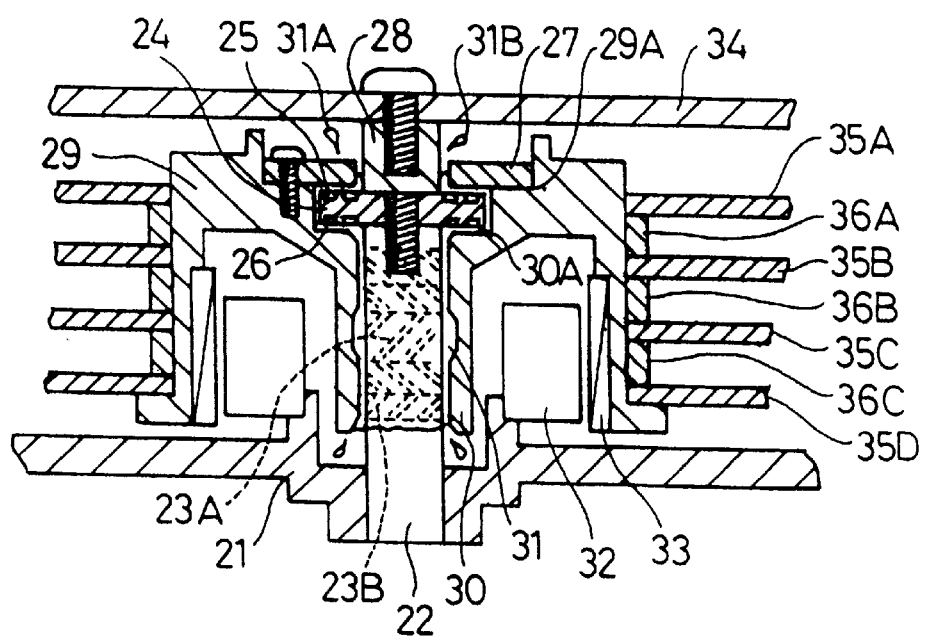
FIG. 7 is a sectional view illustrating a conventional hydrodynamic bearing.
Figure 8:
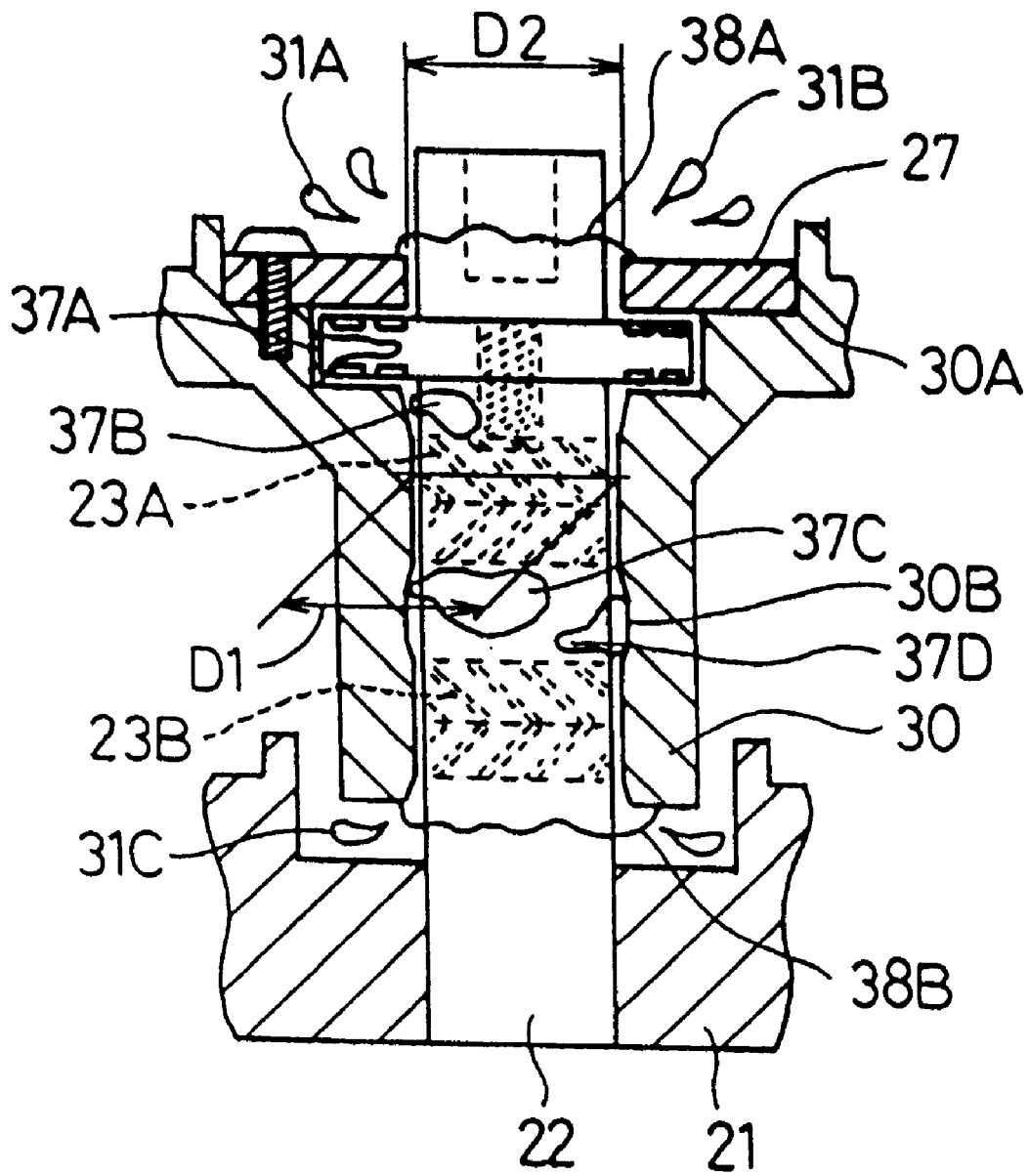
FIG. 8 is a detailed partial view of FIG. 7.

FIG. 5 illustrates a state of the hydrodynamic bearing of the present invention after the bearing is stably rotated for a sufficient period. The radial hydrodynamic grooves 3A, 3B are arranged so that a length L2 is greater than a length L1, and a length L4 is greater by about 0.1 mm to about 0.5 mm than a length L3. During the stable rotation of the bearing, an air-liquid interface 18C is located in such a position that the length L1 is substantially equal to a length L5, and an air-liquid interface 18D is located in such a position that the length L3 is substantially equal to a length L6.

At this time, an air bubble 17G trapped and accumulated in the first larger inner diameter portion 10C of the sleeve 10 has a pressure substantially equal to the atmospheric pressure. When the air bubble 17G expands due to changes in temperature and pressure, the air-liquid interfaces 18C, 18D fluctuate, and the accummulated air bubble 17G is slightly compressed. When the pressure is further increased, the accumulated air bubble 17G moves to the radial hydrodynamic groove 3A or 3B during the rotation or halt, and are expelled upwardly or downwardly from the radial hydrodynamic grooves as indicated by 17H and 17I in FIG. 6. Thus, the air-liquid interfaces 18C, 18D are stabilized.

Since there is not provided an open end of an air channel on an outer circumferential portion of the stationary shaft between the two sets of radial hydrodynamic grooves 3A and 3B, the lubricant retained in the first larger inner diameter portion 10C will never flow out.

In accordance with this embodiment, the lubricant is prevented from flowing out during the high speed rotation or halt, or even if there is a change in pressure or temperature. Thus, the hydrodynamic bearing has a high reliability.

Referring to FIG. 2, the upper shaft portion 2A has a tapered portion 2B which is opposed to the inner circumferential portion 7A of the thrust plate 7 and has a progressively decreasing diameter as it extends apart from the outer thrust hydrodynamic groove 5. The inner circumferential portion 7A of the thrust plate 7 has a smaller inner diameter portion 7B at a position thereof which is opposite to and away from the outer thrust hydrodynamic groove 5, said smaller diameter portion 7B having an inner diameter D5 smaller than the diameter D4 of the inner circumferential portion 7A. Owing to the effects of the tapered portion 2B and the smaller inner diameter portion 7B, the lubricant 11 is assuredly prevented from flowing out due to the centrifugal force.

Further, a portion of the thrust plate 7 adjacent to an upper face thereof is coated with an oil repellent film 14B for prevention of oozing of the lubricant 11. The inclination angle of the tapered portion 2B is in a range from 1 degree to 10 degrees.

Further, the flange member 4 has the recess 4A, in which the accumulated air bubbles 17A, 17B are readily trapped. Accordingly, there is little possibility that the outer thrust hydrodynamic groove 5 and the inner thrust hydrodynamic groove 6 are covered with the air bubbles.

Referring to FIG. 4, the sleeve 10 further has a smaller inner diameter portion 10E and a second larger inner diameter portion 10G on the side thereof adjacent to the lower casing 1 for prevention of the flow-out of the lubricant 11. The sleeve 10 has the tapered portion 10D provided on the outer circumferential portion thereof adjacent to the lower casing 1. Therefore, even if the lubricant happens to flow out as indicated by 11B, the lubricant 11B is downwardly forced back by the centrifugal force. The tapered portion 10D is coated with the oil repellent film 14A which repels the lubricant 11B for prevention of the oozing thereof.

As shown in FIGS. 2 and 3, the two thrust hydrodynamic grooves, i.e., the outer thrust hydrodynamic groove 5 and the inner thrust hydrodynamic groove 6, are provided in a thrust direction. Therefore, the bearing can be maintained in non-contact rotation even if an impact load is applied to the bearing in any direction.

Referring to FIG. 5, the two sets of radial hydrodynamic grooves 3A, 3B of a herringbone configuration are arranged such that the radial hydrodynamic grooves 3A on the side of the flange member 4 has a greater axial length than the other radial hydrodynamic grooves 3B. That is, the following expression is satisfied:

$$(L1+L2)>(L3+L4)$$

This is because unbalanced loads generated by the rotation of the disks 15A, 15B, 15C, 15D are more heavily exerted on the radial hydrodynamic grooves 3A on the side of the flange member 4 than the other radial hydrodynamic grooves 3B. With this arrangement, a frictional torque loss can be minimized, while the two sets of radial hydrodynamic grooves 3A, 3B are subject to substantial loads.

The lubricant 11 is composed of not less than 90% of an ester oil, and not more than half of the remaining 10% of a mineral oil, an olefin, a hydrocarbon or the like. In a hydraulic bearing for use in a disk rotating device, a lubricating oil must not be allowed to scatter or flow out of a bearing portion thereof in a mist form. In view of this, ester-based lubricating oils are far less liable to generate mist than other lubricating oils having an equivalent viscosity. It has experimentally been confirmed that the generation of oil mist increases in the following order:

ester oils<olefin oils<fluoro-oils<silicone oils.

Use of the ester oil in a proportion of not lower than 90% of the lubricant components makes it possible to obtain a disk rotating device free from generating oil mist. Further, a fluoro-resin is used as a material for the oil repellent films 14A and 14B.

The hydrodynamic bearing having the aforesaid construction is highly reliable, and can assuredly prevent the flow-out of the lubricant 11.

The embodiments of the present invention employ the arrangement that the outer diameter of the upper shaft portion and the diameter of the inner circumferential portion of the thrust plate are smaller than the diameter of the bearing bore of the sleeve, and the arrangement that the upper shaft portion of the stationary shaft is formed with the tapered portion which is opposed to the inner circumferential portion of the thrust plate and has a progressively decreasing diameter as it extends apart from the flange member. By employing either of these arrangements, a hydrodynamic bearing can be realized that can suppress the flow-out of the lubricant from a bearing portion thereof, compared with a conventional bearing.

What is claimed is:

1. A hydrodynamic bearing, comprising:
    a stationary shaft fixed at one end thereof to a lower casing and having a flange member and an upper shaft portion adjacent to the other end thereof;
    a sleeve having a bearing bore in which the stationary shaft is inserted; and
    a thrust plate fixed to the sleeve and having a face opposed to a plane face of the flange member and an inner circumferential portion opposed to an outer circumferential portion of the upper shaft portion;
    wherein two sets of herringbone grooves are provided on the stationary shaft, each of the two sets of grooves including a distal zone and a proximal zone, wherein a length of said distal zone in an axial direction is longer than a length of said proximal zone in the axial direction;
    wherein an outer thrust hydrodynamic groove is provided in at least one of the opposed faces of the flange member and the thrust plate;
    wherein an outer diameter of the upper shaft portion and a diameter of the inner circumferential portion of the thrust plate are smaller than a diameter of the bearing bore of the sleeve;
    wherein the stationary shaft has a tapered portion provided on a side thereof opposite the herringbone grooves and across the flange member, the tapered portion having a progressively decreasing diameter as it extends away from the flange member;
    wherein the herringbone grooves and the outer thrust hydrodynamic groove are filled with a lubricant; and
    wherein an air channel is provided inside the stationary shaft with one end thereof opening on an outer circumferential portion of the stationary shaft intermediate the flange member and the herringbone grooves and with the other end thereof communicating with the exterior of the bearing.

2. The hydrodynamic bearing according to claim 1, wherein the upper face, outer circumferential surface and lower face of the flange member are closely adjacent to the thrust plate and a step portion of the sleeve, and a gap defined therebetween is filled with the lubricant, and wherein the flange member has a recess circumferentially provided on the outer circumferential surface thereof.

3. The hydrodynamic bearing according to claim 1, wherein two sets of radial hydrodynamic grooves are provided, and a portion between the two sets of radial hydrodynamic grooves comprises a closed space enclosed by the stationary shaft and the bearing bore of the sleeve, and wherein the stationary shaft has a circumferential groove as an air pit.

4. The hydrodynamic bearing according to claim 1, wherein the sleeve has a second larger inner diameter portion and a smaller inner diameter portion adjacent to the end thereof toward the lower casing, the inner diameter portions being connected to the bearing bore.

5. The hydrodynamic bearing according to claim 1, wherein the inner circumferential portion of the thrust plate has a smaller inner diameter portion adjacent to an upper face of the thrust plate, the smaller inner diameter portion having a diameter smaller than the diameter of the inner circumferential portion of the sleeve.

6. The hydrodynamic bearing according to claim 1, wherein the sleeve has a tapered portion provided on an outer circumferential portion thereof adjacent to the lower casing, the tapered portion having a progressively increasing diameter toward the lower casing.

7. The hydrodynamic bearing according to claim 6, wherein the tapered portion provided on the outer circumferential portion of the sleeve is coated with an oil repellent film.

8. The hydrodynamic bearing according to claim 1, wherein a portion adjacent to an upper face of the thrust plate is coated with an oil repellent film.

9. The hydrodynamic bearing according to claim 1, wherein an inner thrust hydrodynamic groove is provided in at least one of a lower face of the flange member and a face of the sleeve which are opposed to each other.

10. A hydrodynamic bearing, comprising:

a stationary shaft fixed at one end thereof to a lower casing and having a flange member and an upper shaft portion adjacent to the other end thereof;

a sleeve having a bearing bore in which the stationary shaft is inserted; and a thrust plate fixed to the sleeve and having a face opposed to a plane face of the flange member and an inner circumferential portion opposed to an outer circumferential portion of the upper shaft portion;

wherein two sets of herringbone grooves are provided on the stationary shaft, each of the two sets of grooves including a distal zone and a proximal zone, wherein a length of said distal zone in an axial direction is longer than a length of said proximal zone in the axial direction;

wherein an outer thrust hydrodynamic groove is provided in at least one of the opposed faces of the flange member and the thrust plate;

wherein the upper shaft portion of the stationary shaft has a tapered portion which is opposed to the inner circumferential portion of the thrust plate and has a progressively decreasing diameter as it extends away from the flange member;

wherein the stationary shaft has a tapered portion provided on a side thereof opposite the herringbone grooves and across the flange member, the tapered portion having a progressively decreasing diameter as it extends away from the flange member;

wherein the herringbone grooves and the outer thrust hydrodynamic groove are filled with a lubricant; and wherein an air channel is provided inside the stationary shaft with one end thereof opening on an outer circumferential portion of the stationary shaft intermediate the flange member and the herringbone grooves and with the other end thereof communicating with the exterior of the bearing.

* * * * *